US011228383B2

(12) United States Patent
Shiner et al.

(10) Patent No.: US 11,228,383 B2
(45) Date of Patent: Jan. 18, 2022

(54) ESTIMATION OF EXTERNAL NOISE IN A COMMUNICATION CHANNEL

(71) Applicants: Andrew D. Shiner, Ottawa (CA); David Boertjes, Nepean (CA); Michael Andrew Reimer, Stittsville (CA); Maurice O'Sullivan, Ottawa (CA)

(72) Inventors: Andrew D. Shiner, Ottawa (CA); David Boertjes, Nepean (CA); Michael Andrew Reimer, Stittsville (CA); Maurice O'Sullivan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 181 days.

(21) Appl. No.: 16/721,747

(22) Filed: Dec. 19, 2019

(65) Prior Publication Data

US 2021/0194607 A1 Jun. 24, 2021

(51) Int. Cl.
*H04L 1/20* (2006.01)
*H04B 17/336* (2015.01)

(52) U.S. Cl.
CPC .......... *H04B 17/336* (2015.01); *H04L 1/203* (2013.01); *H04L 1/205* (2013.01)

(58) Field of Classification Search
CPC .... H04B 17/336; H04B 17/21; H04B 17/345; H04B 17/3912; H04L 1/203; H04L 1/205; H04L 1/00
See application file for complete search history.

(56) References Cited

U.S. PATENT DOCUMENTS

| 2004/0228425 | A1* | 11/2004 | Peeters | H04L 1/00 375/346 |
| 2006/0133519 | A1* | 6/2006 | Tsatsanis | H04L 27/2647 375/260 |
| 2006/0145829 | A1* | 7/2006 | Watabe | B60C 23/0408 340/447 |
| 2013/0122842 | A1* | 5/2013 | Elfstrom | H04B 17/21 455/226.3 |

OTHER PUBLICATIONS

Hui, et al., "Fiber Optic Measurement Techniques", Elsevier Academic Press, 2009.

* cited by examiner

*Primary Examiner* — Phuc H Tran
(74) *Attorney, Agent, or Firm* — Integral Intellectual Property Inc.; Amy Scouten; Miriam Paton

(57) ABSTRACT

A system configured to perform a method for estimating external noise in a communication channel between a transmitter and a receiver is described. The method comprises obtaining a measurement of effective noise on decoded symbols at the receiver, the decoded symbols comprising noisy versions of symbols conveyed by a communication signal transmitted over the communication channel. The method further comprises storing a representation of a relationship between the effective noise, external noise in the communication channel, and one or more variable parameters. The method further comprises storing applicable values of the variable parameters, wherein each applicable value is associated with current properties of the transmitter or current properties of the receiver or both. The method further comprises calculating an estimate of the external noise in the communication channel using the effective noise, the applicable values of the variable parameters, and the representation of the relationship.

20 Claims, 7 Drawing Sheets

ESTIMATION OF EXTERNAL NOISE IN A COMMUNICATION CHANNEL

TECHNICAL FIELD

This document relates to the technical field of communications.

BACKGROUND

In a communication network, a transmitter may transmit a signal over a communication channel to a receiver, where the signal is representative of digital information in the form of symbols or bits. The receiver may process the signal received over the communication channel to recover estimates of the symbols or bits. Various components of the communication network may contribute to signal degradation, such that the signal received at the receiver comprises a degraded version of the signal that was generated at the transmitter. In the case of an optical signal, degradation or distortion may be caused by polarization mode dispersion (PMD), polarization dependent loss or gain (PDL or PDG), state of polarization (SOP) rotation, amplified spontaneous emission (ASE), wavelength-dependent dispersion or chromatic dispersion (CD), and other effects. The degree of signal degradation may be characterized by a signal-to-noise ratio (SNR), or alternatively by a noise-to-signal ratio (NSR).

SUMMARY

According to abroad aspect, a system configured to perform a method for estimating external noise in a communication channel is described. The method comprises obtaining a measurement of effective noise on decoded symbols at a receiver device, the decoded symbols comprising noisy versions of symbols conveyed by a communication signal transmitted over a communication channel between a transmitter device and the receiver device. The method further comprises storing a representation of a relationship between the effective noise, external noise in the communication channel, and one or more variable parameters. The method further comprises storing applicable values of the one or more variable parameters, wherein each applicable value is associated with current properties of the transmitter device or current properties of the receiver device or both. The method further comprises calculating an estimate of the external noise in the communication channel using the effective noise, the applicable values of the one or more variable parameters, and the representation of the relationship.

According to some examples, the one or more variable parameters comprise internal noise parameters representing respective contributions of the transmitter device and the receiver device to implementation noise.

According to some examples, the one or more variable parameters comprise eye closure parameters representing respective contributions of the transmitter device and the receiver device to noise enhancement at the receiver device.

According to some examples, the current properties comprise any combination of one or more operating settings of the transmitter device, one or more operating settings of the receiver device, one or more operating conditions of the transmitter device, and one or more operating conditions of the receiver device.

According to some examples, the current properties comprise identifiers of the transmitter device or the receiver device or both.

According to some examples, the method further comprises storing a plurality of possible values of each of the one or more variable parameters, the plurality of possible values being associated with a respective plurality of possible properties of the transmitter device or possible properties of the receiver device or both, and selecting the applicable values from the possible values based on the current properties of the transmitter device or the current properties of the receiver device or both.

According to some examples, the method further comprises receiving at least one of the applicable values in a transmission from another device.

According to some examples, the method further comprises storing a plurality of possible representations of the relationship, and selecting the representation from the possible representations based on the current properties of the transmitter device or the current properties of the receiver device or both.

According to some examples, the method further comprises receiving the selected representation in a transmission from another device.

According to some examples, the method further comprises calculating anew estimate of the external noise in the communication channel in response to detecting a change in one or more of the applicable values.

DETAILED DESCRIPTION

Figure 1:
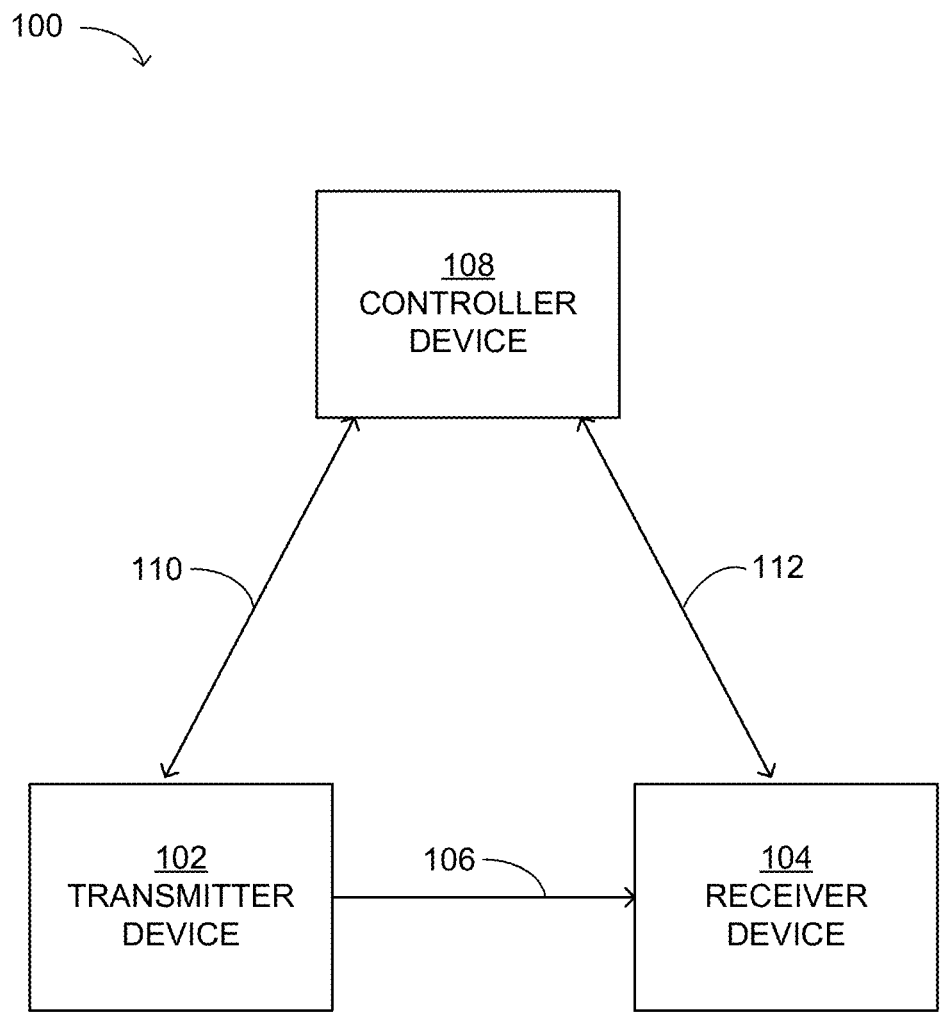
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may further comprise at least one controller device 108, where the controller device 108 is capable of transmitting signals to one or both of the transmitter device 102 and the receiver device 104, or receiving signals from one or both of the transmitter device 102 and the receiver device 104, or both. Communication of signals between the controller device 108 and the transmitter device 102 may take place over a communication channel 110, while communication of signals between the controller device 108 and the receiver device 104 may take place over a communication channel 112.

The communication network 100 may comprise additional elements not illustrated in FIG. 1. For example, the communication network 100 may comprise one or more additional transmitter devices, one or more additional receiver devices, one or more additional controller devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

According to some examples, the controller device 108 may be operable to transmit signals to one or more devices in the communication network 100 to cause changes in one or more parameters of the communication network 100. For example, the parameters may comprise one or more of data rate, launch power, transmission distance, channel spacing, add-drop filter configuration, and network routing.

Various elements and effects in the communication network 100 may result in the degradation of signals transmitted between different devices. Thus, a signal received at the receiver device 104 may comprise a degraded version of a signal transmitted by the transmitter device 102. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), nonlinear noise from propagation through fiber, and other effects. The degree of signal degradation may be characterized by a signal-to-noise ratio (SNR), or alternatively by a noise-to-signal ratio (NSR). The signals transmitted in the communication network 100 may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

The receiver device 104 may receive a communication signal transmitted over a communication channel from the transmitter device 102, where the communication signal conveys symbols that are representative of digital information. At the receiver device 104, the decoded symbols that are recovered may comprise noisy versions of the symbols that were originally transmitted by the transmitter device 102.

Figure 2:
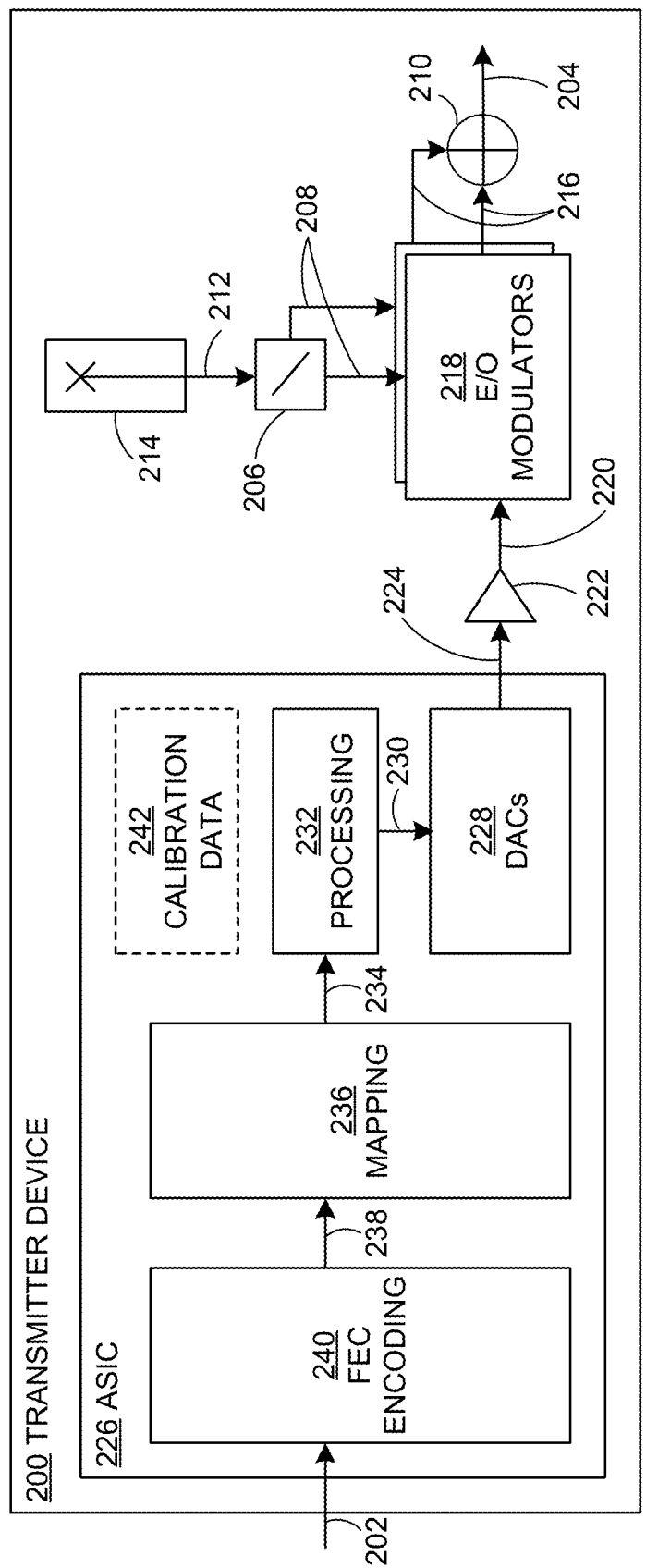
FIG. 2 illustrates an example transmitter device in accordance with some examples of the technology disclosed herein.

FIG. 2 illustrates an example transmitter device 200, in accordance with some examples of the technology disclosed herein. The transmitter device 200 is an example of the transmitter device 102. The transmitter device 200 may comprise additional components that are not described in this document.

The transmitter device 200 is configured to transmit an optical signal 204 which is representative of information bits (also referred to as client bits) 202. According to some examples, the optical transmitter 200 employs polarization-division multiplexing (PDM). In other examples, generation of the optical signal 204 may involve alternative techniques, such as single polarization modulation, modulation of an unpolarized carrier, mode-division multiplexing, spatial-division multiplexing, Stokes-space modulation, polarization balanced modulation, and the like. A laser 214 is configured to generate a continuous wave (CW) optical carrier 212. A polarizing beam splitter 206 is configured to split the CW optical carrier 212 into polarized components 208 that are modulated by electrical-to-optical (E/O) modulators 218 to produce modulated polarized optical signals 216 that are combined by a beam combiner 210, thus yielding the optical signal 204. In some examples (not shown), the polarizing beam splitter 206 and the beam combiner 210 may be replaced with simple power splitters and combiners. Together, elements such as the E/O modulators 218, the laser 214, the beam splitter 206, and the beam combiner 210 may form a communication interface configured to transmit optical signals to other devices in a communication network, such as the network 100.

The transmitter device 200 may comprise an application specific integrated circuit (ASIC) 226. According to some examples, the ASIC 226 may be configured to apply FEC encoding 240 to the client bits 202 to generate FEC-encoded bits 238. The FEC-encoded bits 238 may be mapped to one or more streams of data symbols 234 according to a mapping 236. According to some examples, the symbols 234 may comprise a plurality of parallel streams of symbols where each stream corresponds to a different frequency division multiplexing (FDM) subcarrier.

The ASIC 226 may be configured to apply processing 232 to the one or more streams of symbols 234. The processing 232 may comprise digital up-sampling of the symbols 234. The processing 232 may further comprise operations that are subsequently applied to the sampled waveform, either in the time domain or the frequency domain. Such operations may include pulse shaping, FDM subcarrier multiplexing, distortion pre-compensation, and CD pre-compensation. The processing 232 may include the application of one or more filters, which may involve the application of one or more Fast Fourier Transforms (FFTs) and one or more corresponding inverse FFTs (IFFTs).

Application of the processing 232 to the one or more streams of symbols 234 results in digital drive signals 230, which comprise electrical representations of the optical spectrum that are to be used in the transmission of the optical signal 204. For example, the digital drive signals 230 may comprise four signals corresponding, respectively, to the in-phase (I) and quadrature (Q) components of the X polarization and the I and Q components of the Y polarization.

The transmitter device 200 comprises a plurality of digital-to-analog converters (DACs) 228 which may be used to convert the digital drive signals 230 into respective analog drive signals 224. The power of each signal 224 may be boosted by a power amplifier 222, thereby resulting in amplified analog drive signals 220. Although illustrated as comprised in the ASIC 222, in an alternate implementation the DACs 228 or portions thereof may be separate from the ASIC 226. The DACs 228 may be controlled by a signal received from a voltage-controlled oscillator (VCO) (not shown). The analog drive signals 220 are used to drive the E/O modulators 218, which ultimately results in the optical signal 204.

Figure 3:
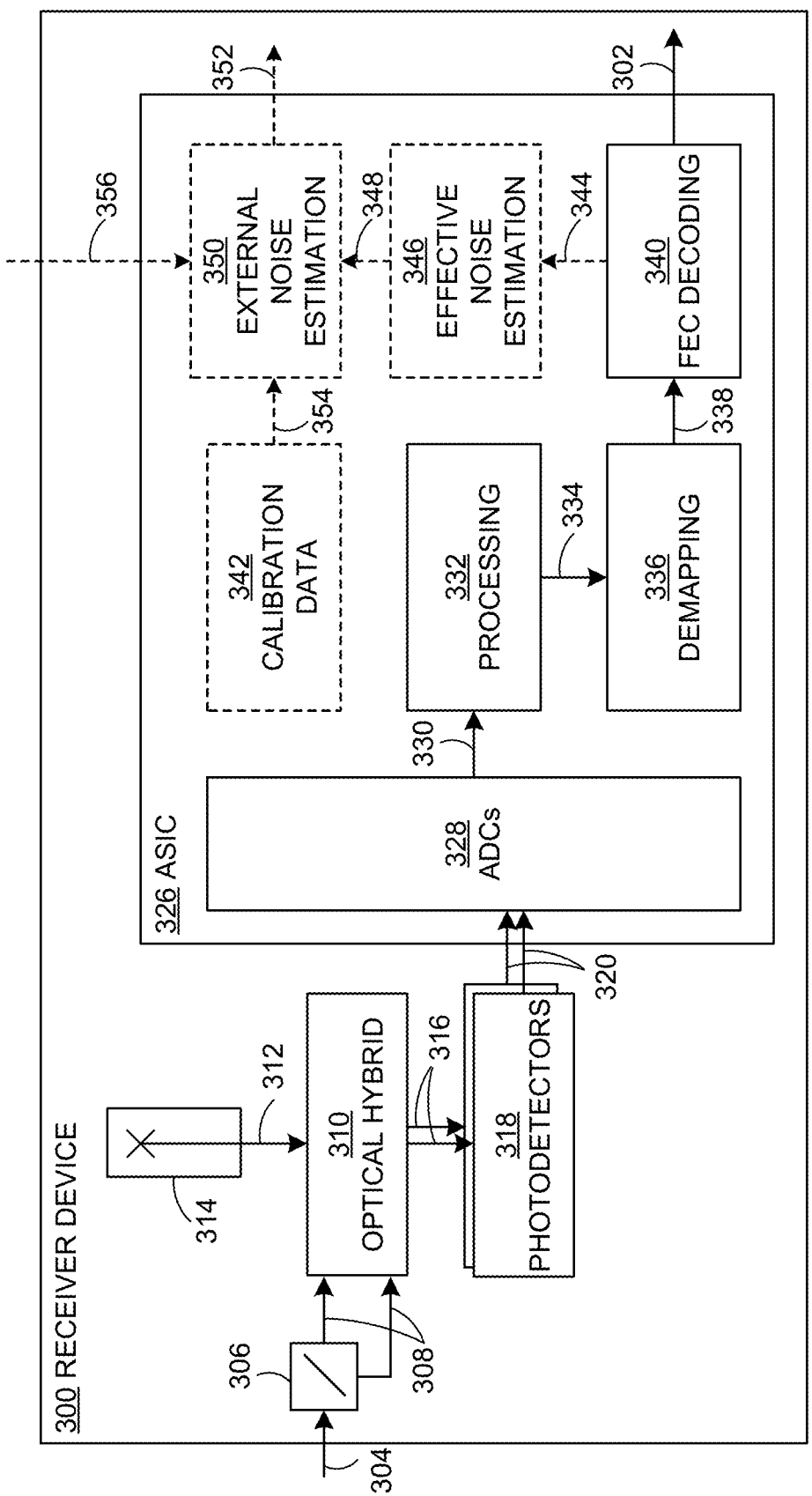
FIG. 3 illustrates an example receiver device in accordance with some examples of the technology disclosed herein.

FIG. 3 illustrates an example receiver device 300, in accordance with some examples of the technology disclosed herein. The receiver device 300 is an example of the receiver device 104. The receiver device 300 may comprise additional components that are not described in this document.

The receiver device 300 is configured to recover corrected client bits 302 from a received optical signal 304. The received optical signal 304 may comprise a degraded version of an optical signal generated by a transmitter device, such as the optical signal 204 generated by the transmitter device 200. A polarizing beam splitter 306 is configured to split the received optical signal 304 into polarized components 308. According to one example, the polarized components 308 may comprise orthogonally polarized components corresponding to an X polarization and a Y polarization. An optical hybrid 310 is configured to process the components 308 with respect to an optical signal 312 produced by a laser 314, thereby resulting in optical signals 316. Photodetectors 318 are configured to convert the optical signals 316 output by the optical hybrid 310 to analog signals 320. According to one example, the analog signals 320 may comprise four signals corresponding, respectively, to the dimensions XI, XQ, YI, YQ, where XI and XQ denote the in-phase and quadrature components of the X polarization, and YI and YQ denote the in-phase and quadrature components of the Y polarization. Together, elements such as the beam splitter 306, the laser 314, the optical hybrid 310 and the photodetector 318 may form a communication interface configured to receive optical signals from other devices in a communication network, such as the network 100.

The receiver device 300 may comprise an ASIC 326. The ASIC 326 may comprise analog-to-digital converters (ADCs) 328 which are configured to sample the analog signals 320, and to generate respective digital signals 326. Although illustrated as comprised in the ASIC 326, in an alternate implementation the ADCs 328 or portions thereof may be separate from the ASIC 326. The ADCs 328 sample the analog signals 320 periodically at a sample rate that is based on a signal received from a VCO at the receiver device 300 (not shown).

The ASIC 326 is configured to apply digital processing 332 to the digital signals 330. The processing 332 may comprise the application of one or more filters to the digital signals 330, which may involve the application of one or more FFTs and one or more corresponding IFFTs. Filtering or equalization operations may include combinations of frequency and time domain operations designed to reduce bit errors on the decoded symbols. Examples include multiple-input multiple-output (MIMO) filtering, clock and carrier recovery, polarization recovery, polarization recovery using a whitening matrix, nonlinear pre- or post-equalization for nonlinear impairments such as those resulting from fiber nonlinearity or amplifier nonlinearity. The processing 332 may also include down-sampling, FDM subcarrier de-multiplexing, distortion post-compensation, and CD post-compensation. The processing 332 (also referred to as symbol equalization) results in decoded symbols 334 (also referred to as post-equalization symbols).

The decoded symbols 334 undergo symbol-to-bit demapping 336 using a decision circuit, thereby resulting in bit estimates 338. Where the optical signal 304 is representative of symbols comprising FEC-encoded bits generated as a result of applying FEC encoding to client bits, the bit estimates 338 may further undergo FEC decoding 340 to recover the corrected client bits 302.

Accurate information about the noise in a communication network, such as the network 100, may be valuable for a variety of reasons. For example, noise measurements may be used to select the optimal transmission rate for a modem or to provide an indication of network health. In general, the ability to maximize the capacity of a network may require an accurate understanding of the noise environment in which the modems are operating.

The noise on the decoded symbols at a receiver, such as the decoded symbols 334 at the receiver device 300, is herein referred to as the effective noise. The effective noise may be characterized by a NSR value $NSR_{EFF}$, or by a SNR value $SNR_{EFF}$, where $SNR_{EFF}=1/NSR_{EFF}$. It is possible to infer the value of $SNR_{EFF}$ on the decoded symbols 334 using the observed BER of the bit estimates 338 and a known relationship between BER and $SNR_{EFF}$, where the relationship is dependent on the modulation format used to map the bits to symbols. Specifically, $SNR_{EFF}$ is equivalent to the additive white Gaussian noise (AWGN) SNR at the input to the demapping 336 which, for the given modulation format, is expected to result in the observed BER. As shown schematically in FIG. 3, in addition to outputting the corrected client bits 302, the FEC decoding 340 may be configured to generate a BER estimate 344, which may undergo a process 346 which generates an effective noise estimate 348, which may be represented by $SNR_{EFF}$. The process 346 may be implemented using a processor inside the ASIC 326 or a processor on a separate chip inside the receiver device 300. The process 346 takes into account that the relationship between BER and effective noise is dependent on the current modulation format. For example, for each possible modulation format, the relationship between BER and $SNR_{EFF}$ may be precalculated and stored in firmware of the receiver device 300 such that the relationship is able to inform the process 346. According to some examples, the relationship between BER and $SNR_{EFF}$ may be represented with a look-up table (LUT), or with a fit polynomial where the coefficients are predetermined for each different modulation format.

There are two broad contributors to the effective noise on decoded symbols at a receiver: implementation noise and external noise. Implementation noise may be understood to refer to the internal noise and/or distortion contributions from the transmitter/receiver pair, while external noise may be understood to refer to noise and/or interference contributions that are attributable to sources outside the transmitter/receiver pair (i.e., noise and/or interference contributions from the communication channel between the transmitter and the receiver). According to one example, external noise may be attributed to polarization activity in a link between an optical transmitter and an optical receiver. Implementation noise may be characterized by a NSR value $NSR_{IMP}$, or by a SNR value $SNR_{IMP}$, where $SNR_{IMP}=1/NSR_{IMP}$ External noise may be characterized by a NSR value $NSR_{EXT}$, or by a SNR value $SNR_{EXT}$, where $SNR_{EXT}=1/NSR_{EXT}$.

Sources of implementation noise at the transmitter device 200 may include noise from quantization and rounding errors in the processing 232, quantization noise and distortion from the DACs 228, additive white thermal noise and nonlinear distortion from the amplifiers 222, frequency drift and phase noise from the laser 214, and non-idealities in the E/O modulators 218, such as errors in the balance between I and Q modulators, the impact of the finite extinction ratio, and the nonlinearity of the E/O modulator response. These factors and others may contribute to noise and distortion on the optical signal 204.

Sources of implementation noise at the receiver device 300 may include frequency drift and phase noise from the laser 314, non-idealities in the optical hybrid 310 (such as those resulting in inter-channel crosstalk, IQ power imbalance, IQ quadrature error, and IQ delay), thermal noise and shot noise from the photodetectors 318, quantization noise and distortion from the ADCs 328, and quantization and rounding errors in the processing 332. Adaptive filters, such as those used in the processing 332, may also contribute as implementation noise at the receiver device 300. According to some examples, an adaptive filter (not shown) may use a control loop to reduce noise on the received symbols 334. Control loops often rely on estimates of noise on the received symbols which are calculated from the difference between the received symbols and estimates of the transmitted symbols. When the noise on the received symbols 334 is relatively low, the estimates of the transmitted symbols may match the actual transmitted symbols, thereby resulting in accurate noise estimates. However, as the noise on the received symbols 334 increases, there is an increased probability that estimates of the transmitted symbols will not match the actual transmitted symbols. These decision errors will result in erroneous estimates of the noise on the received symbols 334, which may cause the control loop to call for the incorrect corrective action some portion of the time. This in turn may contribute to implementation noise at the receiver device 300.

Further examples of implementation noise which may be contributed by the transmitter and the receiver are described by Hui et al. in "Fiber Optic Measurement Techniques," Elsevier Academic Press, 2009.

Where NSR values are used to characterize the implementation noise, the external noise, and the effective noise, the relationship between the values may be expressed by Equation 1:

$$NSR_{EFF}=EC(NSR_{EXT}+NSR_{IMP}) \qquad [1]$$

where $NSR_{EFF}$ denotes the effective NSR, where $NSR_{EXT}$ denotes the external NSR, where $NSR_{IMP}$ denotes the implementation NSR, and where EC denotes an eye closure parameter which reflects noise enhancement. Due to the intrinsic sources of noise at the transmitter and the receiver, $NSR_{IMP}>0$. Thus, even in a theoretical scenario where $NSR_{EXT}=0$, it is expected that $NSR_{EFF}>0$ due to the fact that $NSR_{IMP}>0$. In most cases the eye closure parameter EC has a value greater than one, that is EC>1, such that one unit of noise added to the signal during propagation from the transmitter to the receiver will result in more than one unit of noise observed on the received symbols post-equalization. The precise value of the eye closure parameter EC may depend on different factors which contribute to noise enhancement. For example, as described previously, the efficacy of control loops (such as those used in the processing 332) may be affected by decision errors, which may increase with $NSR_{EXT}$ and $NSR_{IMP}$. In another example, implementation noise may be contributed by the transmitter device 200 in the form of distortion. At the receiver device 300, the processing 332 may partially correct this distortion by applying transformations to the received optical signal 304, where the transformations attempt to minimize the total noise on the decoded symbols. However, in so doing, the transformations may also enhance additive noise from the line. This enhancement would be reflected by the eye closure parameter EC.

As previously described, it may be of interest to obtain information about the noise environment in which a network device is operating. This information may be used for assessment of network health and for optimal network provisioning.

Existing techniques for estimating the external noise in a communication channel generally rely on broad assumptions about the noise contributions from the transmitter and the receiver. For example, referring to Equation 1, assumptions may be made that noise enhancement is negligible (EC=1) and that the implementation noise is the sum of the assumed noise contributions from the transmitter and the receiver (based, for example, on their respective types or model numbers). With these assumptions, an estimate of the external noise may be calculated according to Equation 2:

$$NSR_{EXT}=NSR_{EFF}-NSR_{IMP} \qquad [2]$$

where $NSR_{EXT}$ denotes the external NSR, where $NSR_{EFF}$ denotes the effective NSR, and where $NSR_{IMP}$ denotes the assumed implementation NSR value representative of the combined noise contributions from the transmitter and receiver.

The assumption that EC=1 may result in an estimate of $NSR_{EXT}$ that is inaccurate, or of insufficient accuracy for a given application. The accuracy of the $NSR_{EXT}$ estimate may particularly suffer when the effective noise is very low.

The assumption that the noise contributions from the transmitter and the receiver may be characterized by a single constant value may also lead to an inaccurate estimate of the external noise. As will be described in more detail herein, the noise generated by a given network device, such as the transmitter device 200 or the receiver device 300, may vary based on current properties of that device. Such properties may include current operating settings such as operating mode, control mode, polarization tracking speed, modulation format, transmission mode, capacity, firmware version, firmware settings, least mean squares (LMS) gain, pulse shaping, and channel filtering effects. The current properties of a network device may also include the current operating conditions, such as received optical power. Properties associated with device manufacturing may also lead to variations in implementation noise. For example, different hardware realizations may generate different amounts of internal noise. In addition, even with all hardware, operating settings, and operating conditions being equal, for a given set of devices produced on a manufacturing line, there may be some distribution in the amount of internal noise generated by those devices. In other words, the noise contribution of a transmitter (or receiver) may be specific that particular instance of the transmitter (or receiver). Thus, for example, a serial number that uniquely identifies a specific instance of a transmitter or a receiver may be an example of a "current property" to be taken into account when modeling the noise behaviour of that device. Thus, as used herein, "current properties" may be understood to include static properties, such as device identification. According to some examples, "current properties" may refer to the most recently known values of the properties or even to assumed or expected values of the properties. For example, for a transmitter device with serial number XYZ123 that has just been updated with firmware version J, and which is expected to operate in 56-200G mode, the "current properties" of the transmitter device may comprise: serial number=XYZ123; firmware version=J; and transmission mode=56-200G.

Figure 4:
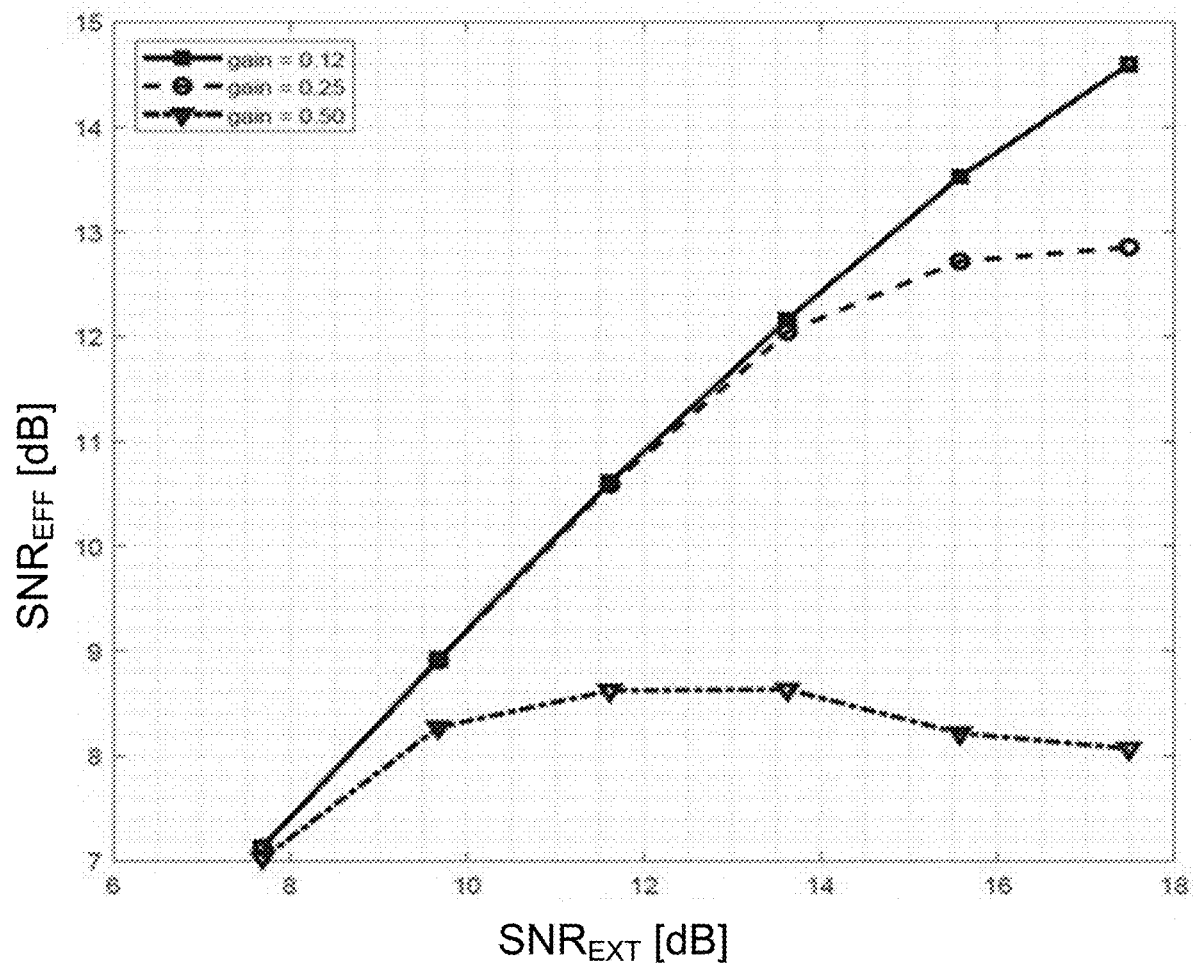
FIG. 4 illustrates an example of the impact of different operating settings on the relationship between external noise and effective noise.

As a demonstration of the potential impact that a change in an operating setting may have on the accuracy of an estimate of the external noise, FIG. 4 illustrates measurements of $SNR_{EFF}$ (in dB) as a function of $SNR_{EXT}$ (in dB) for three different values of LMS gain used for communication between a transmitter device and a receiver device. In this example, the external noise values are equivalent to known values of ASE noise injected between the transmitter device and the receiver device. It is apparent from FIG. 4 that the relationship between $SNR_{EFF}$ and $SNR_{EXT}$ is not linear, and is dependent on the LMS gain. For a given value of $SNR_{EFF}$, the estimate of $SNR_{EXT}$ could be very different depending on the choice of LMS gain. LMS gain is expected to change with transmission mode and polarization tracking mode. Thus, in order to obtain an accurate estimate of SNR from $SNR_{EFF}$, it may be necessary to account for the current transmission mode and/or polarization tracking mode.

Existing techniques for estimating external noise may not accurately or adequately account for the respective noise contributions or noise responses of the transmitter device and the receiver device. This document proposes technology for improving estimation of the external noise in a communication channel between a transmitter device and a receiver device by accounting for potential variability in the noise contributions and noise responses of the transmitter device and the receiver device, and also optionally accounting for potential variability in the relationship between the external noise and the effective noise.

To account for the potential variability in the noise contributions and noise responses of a transmitter/receiver pair, the relationship between SNR and $SNR_{EFF}$ may be expressed by a parameterized model, where the model is a function of parameters associated with noise generated at the transmitter or the receiver or both. According to some examples, the applicable values of one or more of the parameters may be associated with current properties of the transmitter or the receiver or both. According to some examples, a plurality of possible values of the parameters may be determined during calibration of a given device as a result of operating that device using a plurality of different operating settings and/or operating conditions. According to some examples, a plurality of possible values of the parameters may be associated with a respective plurality of different instances of a device, or to a plurality of respective sets of devices. For example, calibration data could be obtained for every tenth device in a production line, and that same calibration data could be considered applicable to the subsequent nine devices.

Figure 5:
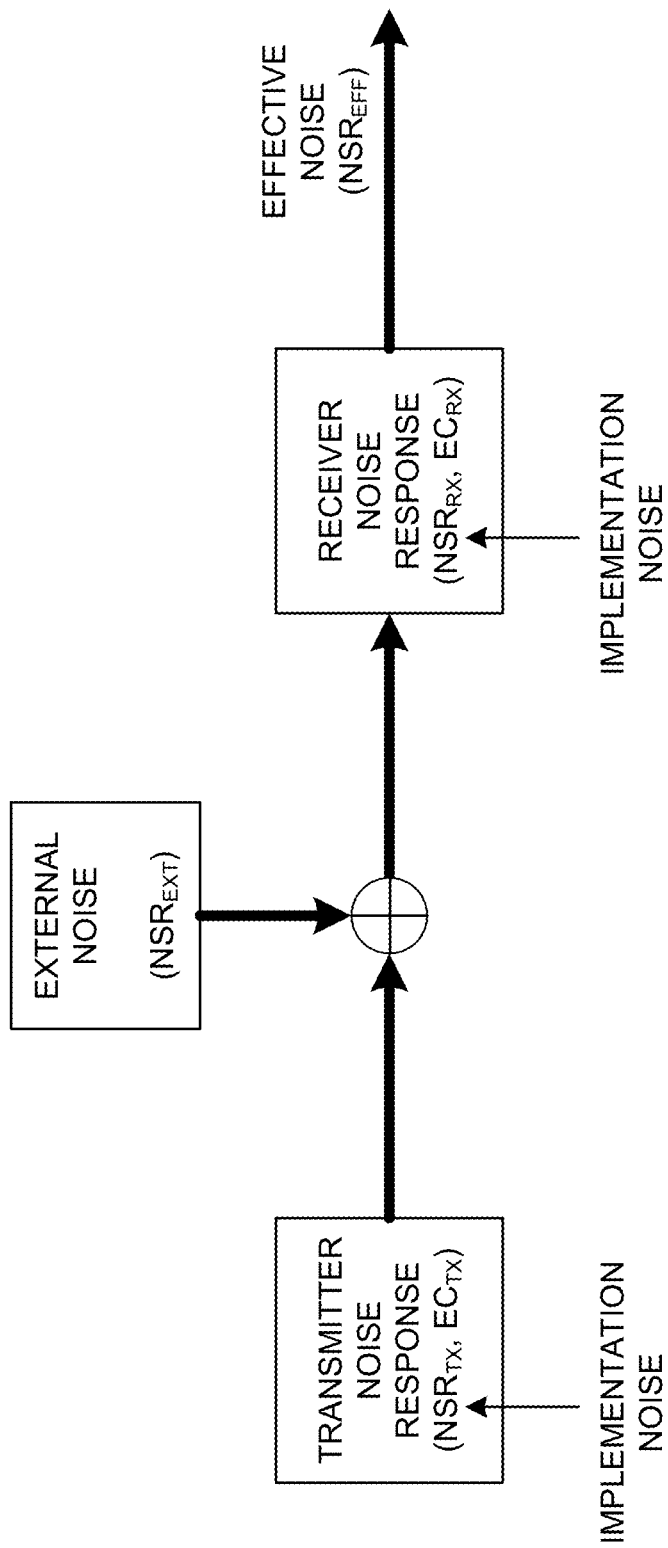
FIG. 5 illustrates a schematic showing an example relationship between external noise and effective noise.

FIG. 5 illustrates a schematic showing an example relationship between NSR and $NSR_{EFF}$ in accordance with some examples of the technology disclosed herein. As previously described with respect to FIG. 3, the effective noise may be characterized by the NSR value $NSR_{EFF}$, which may be inferred from the decoded symbols using measurements of the BER. The effective noise is dependent on both the implementation noise contributed by the transmitter/receiver pair and the external noise contributed by sources outside the transmitter/receiver pair. The external noise presents as additive noise at the receiver and may be characterized by the NSR value $NSR_{EXT}$. It may be advantageous to express the implementation noise in terms of a transmitter contribution characterized by the NSR value $NSR_{TX}$, and a receiver contribution characterized by the NSR value $NSR_{RX}$. As previously described, in addition to being dependent on the implementation noise and the external noise, the effective noise may also be dependent on noise enhancement at the receiver. In some examples, the noise enhancement may be characterized by a single eye closure parameter EC as described with respect to Equation 1. However, it may be advantageous to express the noise enhancement in terms of a transmitter contribution $EC_{TX}$ and a receiver contribution $EC_{RX}$, where $EC_{TX} \cdot EC_{RX} = EC$. For example, if the transmitter device 200 introduces distortion into a transmitted waveform, the processing 332 applied at the receiver 300 may involve the application of transformations to repair the distortion. However, any ASE that has been added to the waveform during propagation may be enhanced as a result of the transformations. Thus, because the distortion originates at the transmitter device 200, the distortion may be considered as contributing to the value of $EC_{TX}$. In another example, decision errors affecting control loops at the receiver device 300 may be considered as contributing to the value of $EC_{RX}$.

In general, transmitter noise and distortion may be represented by $NSR_{TX}$, while the roles that the transmitter noise and distortion play in contributing to noise enhancement at the receiver may be represented by $EC_{TX}$. Collectively, $NSR_{TX}$ and $EC_{TX}$ may be referred to as the noise response of the transmitter. In general, receiver noise and distortion may be represented by $NSR_{RX}$, while the roles that the receiver noise and distortion play in contributing to noise enhancement at the receiver are represented by $EC_{RX}$. Collectively, $NSR_{RX}$ and $EC_{RX}$ may be referred to as the noise response of the receiver.

Equation 3 provides a representation of the example relationship between $NSR_{EXT}$ and $NSR_{EFF}$ illustrated in FIG. 5:

$$NSR_{EFF} = EC_{TX} EC_{RX} (NSR_{TX} + NSR_{RX} + NSR_{EXT}) \qquad [3]$$

where $NSR_{EFF}$ is a measure of the effective noise on the decoded symbols, where $NSR_{TX}$ and $EC_{TX}$ denote the noise response of the transmitter, where $NSR_{RX}$ and $EC_{RX}$ denote the noise response of the receiver, and where $NSR_{EXT}$ denotes the external noise to be estimated.

The parameterized model defined by Equation 3 may be used in the calculation of $NSR_{EXT}$ from a measured value of $NSR_{EFF}$. In this case, the parameters are $NSR_{TX}$, $NSR_{RX}$, $EC_{TX}$, and $EC_{RX}$. According to some examples, the values to be used for these parameters may be specific to current properties of the transmitter or the receiver or both, including, for example, current operating settings and/or current operating conditions. According to some examples, the values to be used for at least some of the parameters may be specific to a unique instance of a device, or to a set of devices. Based on the current properties of the transmitter or the receiver or both, the applicable values may be selected from a plurality of possible values, the possible values having been determined during device calibration, for example, by sweeping through a series of different input noise levels at a series of different operating settings and calibrating the response of the device. According to some examples, the plurality of possible values may be comprised in one or more LUTs.

For a given transmitter/receiver pair, the representation of the relationship between the external noise and the effective noise, as well as the applicable values of the parameters, may be stored in one or more devices in the communication network such that they are accessible for calculating an estimate of the external noise based on a measurement of effective noise.

According to some examples, the transmitter device 200 may store calibration data 242 as illustrated in FIG. 2, where the calibration data 242 may comprise one or more representations of possible relationships between external noise and effective noise, including a relationship that is applicable to the transmitter device 200. The calibration data 242 may also comprise possible values of parameters upon which the relationships depend, including applicable values that are associated with the current properties of the transmitter device 200. The calibration data 242 may optionally comprise applicable parameter values that are associated with the current properties of a device with which the transmitter device 200 is communicating, such as the receiver device 300.

According to some examples, the receiver device 300 may store calibration data 342 as illustrated in FIG. 3, where the calibration data 342 may comprise one or more representations of possible relationships between external noise and effective noise, including a relationship that is applicable to the receiver device 300. The calibration data 342 may also comprise possible values of parameters upon which the relationships depend, including applicable values that associated with the current properties of the receiver device 300. The calibration data 342 may optionally comprise applicable parameter values that are associated with the current properties of a device with which the receiver device 300 is communicating, such as the transmitter device 200.

According to some examples (not shown), a controller device, such as the controller device 108, may store calibration data comprising one or more representations of possible relationships between external noise and effective noise, and possible values of parameters upon which the relationships depend.

According to one example, where the relationship between $NSR_{EXT}$ and $NSR_{EFF}$ is defined by Equation 3, the calibration data 242 stored at the transmitter device 200 may comprise applicable values for the parameters $EC_{TX}$ and $NSR_{TX}$ that are associated with current properties of the transmitter device 200, and the calibration data 342 stored at the receiver device 300 may comprise applicable values for the parameters $EC_{TX}$ and $NSR_{RX}$ that are associated with current properties of the receiver device 300. According to some examples, the applicable values of $EC_{TX}$ and $NSR_{TX}$ may be selected from one or more LUTs comprising a plurality of possible values of $EC_{TX}$ and $NSR_{TX}$ corresponding to a plurality of possible properties of the transmitter device 200, where the LUTs may be stored in the transmitter device 200 or in another device, such as a controller device. According to some examples, the applicable values of $EC_{RX}$ and $NSR_{RX}$ may be selected from one or more LUTs comprising a plurality of possible values of $EC_{RX}$ and $NSR_{RX}$ corresponding to a plurality of possible properties of the receiver device 300.

An estimate of the external noise in the communication channel between the transmitter 200 and the receiver may be calculated using an estimate of the effective noise on the decoded symbols 334 at the receiver device 300, and the applicable calibration data. As previously described, the receiver device 300 may use the process 346 to generate the effective noise estimate 348 based on the BER estimate 344 and the current modulation format. According to some examples, the receiver device 300 may further be configured to implement a process 350 which generates an external noise estimate 352 based on the effective noise estimate 348 and applicable calibration data, where the applicable calibration data includes (1) a representation of a relationship between $NSR_{EXT}$ and $NSR_{EFF}$ that is to be used, and (2) the parameter values that are associated with the current properties of the transmitter device 200 or the receiver device 300 or both. The applicable calibration data may be selected from the calibration data 342 stored locally at the receiver device 300, or may be received in one or more transmissions from other network devices.

According to one example, a processor of the receiver device 300 (such as a processor of the ASIC 326 or a separate processor) may execute code stored in a memory of the receiver device 300 (not shown), where execution of the code causes the processor to select from the calibration data 342 the representation of the relationship between $NSR_{EXT}$ and $NSR_{EFF}$ that is to be used in the process 350. For example, the calibration data 342 may comprise a plurality of possible representations of the relationship between $NSR_{EXT}$ and $NSR_{EFF}$, and the processor may select the relationship represented by Equation 3. Execution of the code may also cause the processor to select from the calibration data 342 the applicable values of the parameters $EC_{RX}$ and $NSR_{RX}$. For example, the calibration data 342 may comprise a plurality of possible values of the parameters $EC_{RX}$ and $NSR_{RX}$, and the processor may select from the calibration data 342 the values of $EC_{TX}$ and $NSR_{RX}$ that are applicable to the current operating settings of the receiver device 300. Execution of the code may cause the processor to provide the calibration data selected from the locally stored calibration data 342 to the process 350, as denoted by the arrow 354.

As previously described, some portion of the applicable calibration data to be used in the process 350 may be received in one or more transmissions from other network devices. For example, the values of the parameters $EC_{TX}$ and $NSR_{TX}$ that are applicable to the current operating settings of the transmitter device 200 may be received in a transmission from another network device, as denoted by the arrow 356. For example, the values may be transmitted directly from the transmitter device 200 or from another device, such as the controller device 108. Additionally, a representation of a relationship between $NSR_{EXT}$ and $NSR_{EFF}$ may be received in a transmission from another network device, where the relationship may be applicable, for example, to the transmitter device 200. Applicable calibration data that is received in a transmission from another device may have been selected, at that device, in a similar manner to the selection of applicable calibration data from the calibration data 352 stored locally at the receiver device 300. For example, the transmitter device 200 may store calibration data (not shown) comprising a plurality of possible values of the parameters $EC_{TX}$ and $NSR_{TX}$, and a processor of the transmitter device 200 (not shown) may select from its local calibration data the values of $EC_{TX}$ and $NSR_{TX}$ that are applicable to the current operating settings of the transmitter device 200. The processor of the transmitter device 200 may then cause the selected values of $EC_{TX}$ and $NSR_{TX}$ to be transmitted to the receiver device 300.

Based on the effective noise estimate 348, the applicable values of $EC_{TX}$, $NSR_{TX}$, $EC_{RX}$, and $NSR_{RX}$, and the relationship provided by Equation 3, execution of the process 350 may generate the external noise estimate 352.

According to another example (not shown), a receiver may transmit outsource the external noise estimation process 350 to another device. For example, the receiver device 300 may transmit the effective noise estimate 348 to the controller device 108. In this case, the controller device may implement a process, similar to the process 350, for estimating external noise on a communication channel between the transmitter device 200 and the receiver device 300. The controller may receive the applicable values of $EC_{TX}$ and $NSR_{TX}$ from the transmitter device 200, and the applicable values of $EC_{RX}$ and $NSR_{RX}$ from the receiver device 300, the applicable values having been respectively selected by the transmitter device 200 and the receiver device 300 based on their respective current properties. Alternatively, the controller device 108 may determine the applicable values of $EC_{TX}$, $NSR_{TX}$, $EC_{RX}$, and $NSR_{RX}$ by selecting them from a database comprising calibration data for various transmitters and receivers in the communication network. For example, based on identifying information about the transmitter device 200 and the receiver device 300, such as their respective serial numbers, the controller device 108 may determine which LUTs in the database contain the relevant calibration data for the transmitter device 200 and receiver device 300 in question. Then, based on the current properties of the transmitter device 200 and the receiver device 300, the controller device 108 may perform processing to select the applicable values of $EC_{TX}$, $NSR_{TX}$, $EC_{RX}$, and $NSR_{RX}$ to use in the calculation of $NSR_{EXT}$. According to some examples, one or both of the transmitter device 200 and the receiver device 300 may transmit to the controller device 108 a representation of the relationship to be used for calculating $NSR_{EXT}$.

According to some examples, for a given transmitter/receiver pair, the transmitter and the receiver may be associated with different sets of parameters and/or different relationships between $NSR_{EXT}$ and $NSR_{EFF}$. In such cases, the calculation of $NSR_{EXT}$ may be performed using an appropriate combination of the different sets of parameters and/or the different relationships.

It is contemplated that the information to be used in the calculation of $NSR_{EXT}$ may be requested by and/or transmitted to the appropriate electronic devices in the communication network either periodically or responsive to a prompting event. For example, a change in an operating setting of the transmitter device 102 may prompt the transmitter device 102 to transmit newly applicable values of $EC_{TX}$ and $NSR_{TX}$ to the receiver device 104. The receiver device 104 may then use the newly applicable values of $EC_{TX}$ and $NSR_{TX}$ to calculate a new estimate of $NSR_{EXT}$ based on a representation of the relationship stored at the receiver device 104. The receiver device 104 may then send the new estimate of $NSR_{EXT}$ to the controller device 108. In another example, the controller device 108 may send requests (either periodically, or in response to user input or some other event) to the transmitter device 102 and the receiver device 104, where the requests prompt the transmitter device 102 and the receiver device 104 to return the applicable values of $EC_{TX}$, $NSR_{TX}$, $EC_{RX}$, and $NSR_{RX}$ that correspond to the current properties of the transmitter device 102 and the receiver device 104. The controller device 108 may use the received values, together with a selected relationship or model, to calculate an estimate of $NSR_{EXT}$. In addition to transmitting applicable values of parameters to be used in the calculation of $NSR_{EXT}$, representations of the relationships themselves may also be transmitted between devices.

Equation 3 is merely one example model of the relationship between effective noise and external noise. Other models may be defined which comprise additional parameters, fewer parameters, or alternative parameters. For example, in certain applications, the power of a received communication signal may be low enough that thermal noise in the receiver becomes a significant contributing factor to $NSR_{RX}$. In this case, the model might have an additional parameter of received optical power.

The model provided in Equation 3 enables a calculation of a NSR estimate. However, other models may facilitate calculations of other types of noise and/or interference estimates. In general, the techniques described herein may be applied using any model that effectively decouples the noise and/or interference contributions of the communication channel from the noise and/or interference contributions that are intrinsic to the transmitter/receiver pair.

Estimates of external noise may serve a variety of purposes. For example, the estimate 352 generated by the process 350 may be displayed to a user via a local display screen of the receiver device 300, or may be transmitted to another device, such as the controller device 108. According to some examples, an estimate of external noise may serve as an input to a subsequent calculation, such as a calculation of an optical signal to noise ratio (OSNR). Estimates of external noise may provide an indication of network health and may be used for comparison with expected network performance. The estimates may be used at an orchestration level to influence provisioning of the network, to optimize power to the network, or to reroute or redirect communications/traffic in the network. For example, based on a particular estimate of external noise, an administrator may make a decision to apply (or not to apply) a particular change in the network. Changes in the network could include changes to various network parameters, such as channel power, choice of modulation format, FEC coding, carrier recovery parameters or other modem parameters, routing of a channel or its neighbours, and the like.

Figure 6:
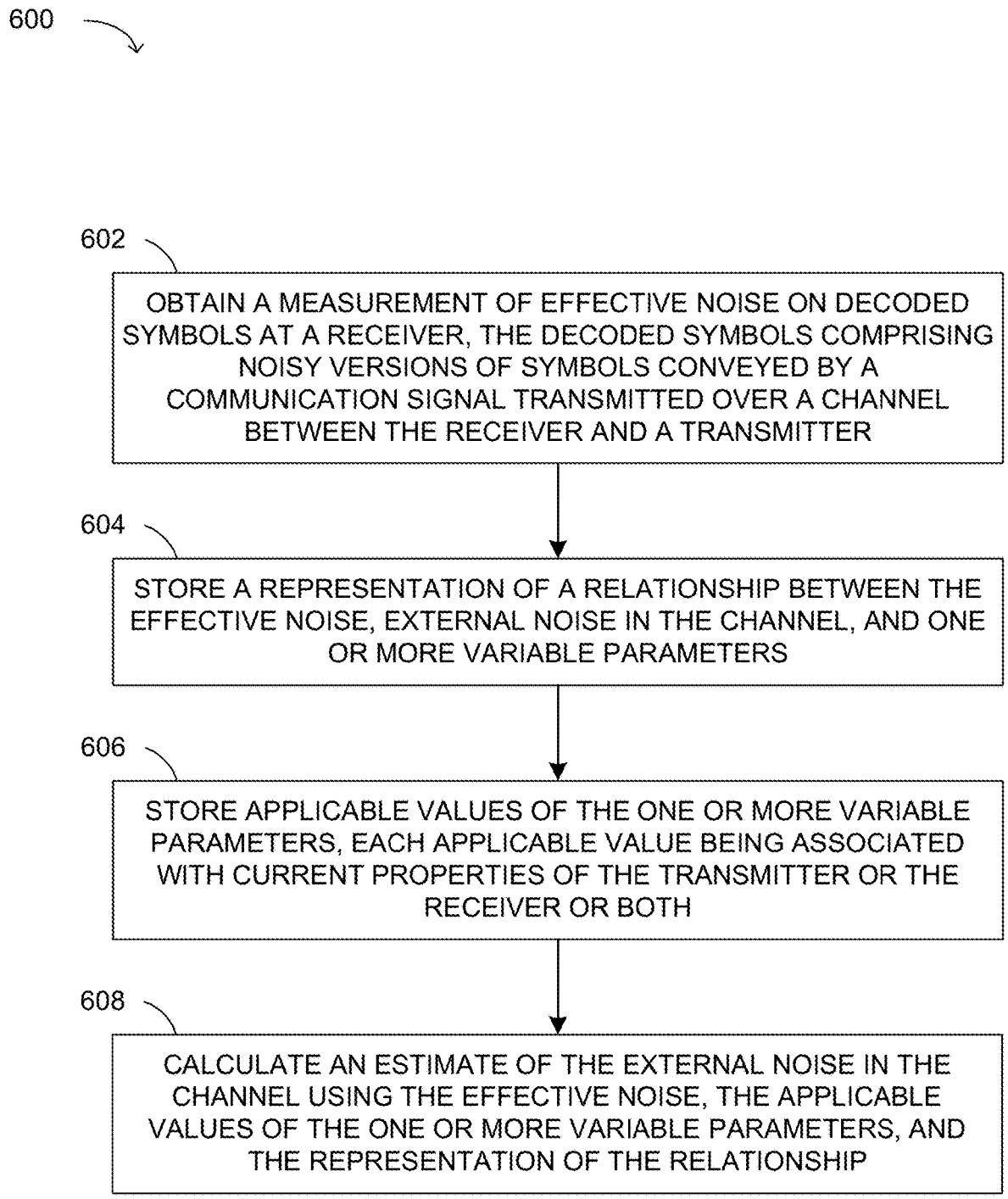
FIG. 6 illustrates a first example method for estimation of external noise while accounting for transmitter and receiver contributions in accordance with some examples of the technology disclosed herein.

FIG. 6 illustrates an example method 600 for estimation of external noise in accordance with some examples of the technology disclosed herein. According to some examples, the method 600 is performed in a communication network, such as the communication network 100. In general, the method 600 may be performed by a system comprising circuitry configured to implement the various steps of the method 600. The circuitry may be comprised in a single electronic device, or may be distributed within more than one electronic device. For example, the circuitry may be comprised in some combination of the transmitter device 102 and/or 200, the receiver device 104 and/or 300, and the controller device 108. The circuitry may comprise various combinations of processors (including DSPs), circuit packs, computer-readable media (including firmware or software or both) storing computer-executable instructions or code, ASICs, and the like.

At 602, a measurement is obtained of effective noise on decoded symbols at a receiver, where the decoded symbols comprise noisy versions of symbols conveyed by a communication signal transmitted over communication channel between the receiver and a transmitter. According to some examples, the measurement may be represented as a NSR value or a SNR value. According to some examples, "obtaining" the measurement may comprise measuring one or more signals and optionally performing calculations using those signals. For example, the measurement of the effective noise may be obtained using the process 346, described with respect to FIG. 3. Alternatively or additionally, "obtaining" the measurement may comprise receiving an indication of the measurement in a transmission from another device in the communication network. According to one example, a measurement of the effective noise at a receiver may be obtained at a network controller in the form of a transmission from the receiver.

At 604, a representation of a relationship between the effective noise, the external noise in the communication channel, and one or more variable parameters is stored. According to some examples, the representation may comprise a fit function. According to some examples, the variable parameters may comprise an eye closure parameter representing noise enhancement at receiver. According to some examples, the variable parameters may comprise one eye closure parameter representing a contribution from the transmitter to noise enhancement at the receiver, and another eye closure parameter representing a contribution from the receiver to noise enhancement at the receiver. According to some examples, the variable parameters may comprise one internal noise parameter representing implementation noise contributed by the transmitter, and another internal noise parameter representing implementation noise contributed by the receiver. According to some examples, the relationship may be specific to the current properties of the transmitter or the current properties of the receiver or both. According to some examples, the representation of the relationship may be stored at the transmitter or the receiver or another network device, such as the controller. For example, the representation of the relationship may be stored as part of the calibration data 242 or the calibration data 342 or both.

At 606, applicable values of the one or more variable parameters are stored, where each applicable value is associated with current properties of the transmitter device or current properties of the receiver device or both. According to some examples, the current properties may comprise any one or more of LMS gain, transmission mode, polarization tracking mode, hardware realization, firmware version, modulation format, coding, pulse shaping, channel filtering effects, control parameters, and received power. According to some examples, each value may be based on a calibration of the transmitter (or another device that is representative of the transmitter) or a calibration of the receiver (or another device that is representative of the receiver). According to some examples, the calibrations may involve storing measurements of parameter values associated with different possible combinations properties. According to some examples, the values may be stored in one or more LUTs. The LUTs may be stored in some combination of the transmitter, the receiver, and the controller. According to one example, the applicable parameter values associated with the current properties of the transmitter device 200 may be stored as part of the calibration data 242, and the applicable parameter values associated with the current properties of the receiver device 300 may be stored as part of the calibration data 342.

According to some examples, the actions at 602, 604, and 606 may be performed in parallel or in a different order than illustrated in FIG. 6.

At 608, an estimate of the external noise in the communication channel is calculated using the effective noise measured at 602, the representation of the relationship stored at 604, and the applicable values stored at 606. According to some examples, the estimate may be represented as a NSR value or a SNR value. According to some examples, the external noise estimate may be calculated at the receiver, for example, using the process 350 described with respect to FIG. 3. According to other examples, the external noise estimate may be calculated at the transmitter, at the controller, or at some other network device.

Figure 7:
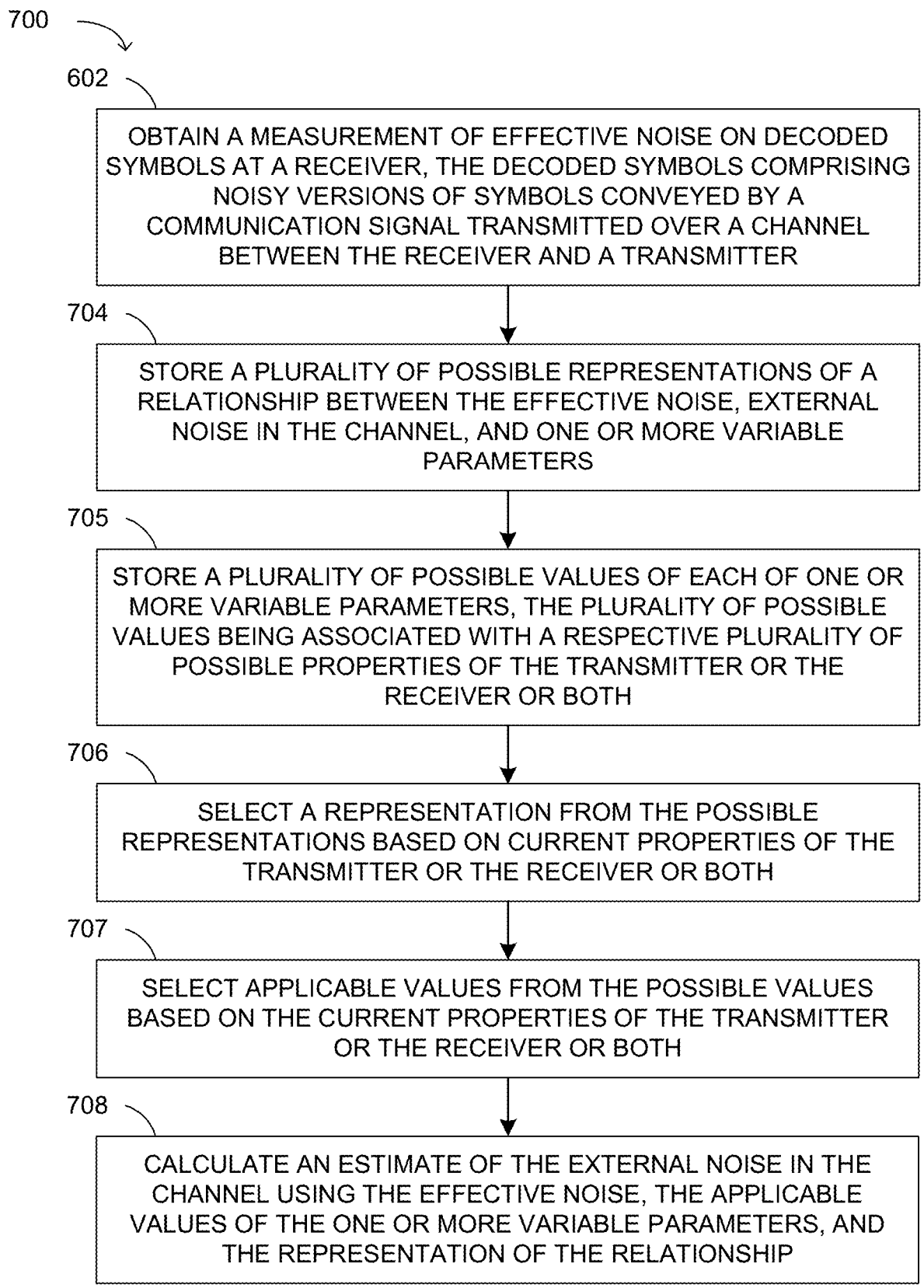
FIG. 7 illustrates a second example method for estimation of external noise while accounting for transmitter and receiver contributions in accordance with some examples of the technology disclosed herein.

FIG. 7 illustrates an example method 700 for estimation of external noise in accordance with some examples of the technology disclosed herein. The method 700 is a variation of the method 600. According to some examples, the method 700 is performed in a communication network, such as the communication network 100. In general, the method 700 may be performed by a system comprising circuitry configured to implement the various steps of the method 700. The circuitry may be comprised in a single electronic device, or may be distributed within more than one electronic device. For example, the circuitry may be comprised in some combination of the transmitter device 102 and/or 200, the receiver device 104 and/or 300, and the controller device 108. The circuitry may comprise various combinations of processors (including DSPs), circuit packs, computer-readable media (including firmware or software or both) storing computer-executable instructions or code, ASICs, and the like.

Similar to the method 600, the method 700 begins at 602 with obtaining a measurement of effective noise on decoded symbols at a receiver.

At 704, a plurality of possible representations of a relationship between the effective noise, the external noise in the communication channel, and one or more variable parameters are stored. According to some examples, each possible representation may comprise a fit function. According to some examples, the plurality of possible representations may be stored at the transmitter or the receiver or another network device, such as the controller, or some combination thereof. For example, the plurality of possible representations may be stored as part of the calibration data 242 or the calibration data 342 or both. According to some examples, the plurality of possible representations may be associated with a respective plurality of possible properties of the transmitter device or possible properties of the receiver device or both.

At 705, a plurality of possible values of one or more variable parameters are stored, the plurality of possible values being associated with a respective plurality of possible properties of the transmitter device or current properties of the receiver device or both. According to some examples, each possible value may be based on a calibration of the transmitter (or another device that is representative of the transmitter) or a calibration of the receiver (or another device that is representative of the receiver). According to some examples, the plurality of possible values may be stored in one or more LUTs. According to some examples, the plurality of possible values may be stored at the transmitter or the receiver or another network device, such as the controller, or some combination thereof. According to one example, the plurality possible values may be stored as part of the calibration data 242 and part of the calibration data 342.

At 706, a representation is selected from the possible representations stored at 704, based on current properties of the transmitter device or the current properties of the receiver device or both.

At 707, applicable values are selected from the possible values stored at 705, based on the current properties of the transmitter device or the current properties of the receiver device or both.

According to some examples, the actions at 602, 704, and 705 may be performed in parallel or in a different order than illustrated in FIG. 7. According to some examples, the actions at 706 and 707 may be performed in parallel or in a different order than illustrated in FIG. 7. In one example, the action at 602 of obtaining a measurement of effective noise on decoded symbols may be performed after one or both of the actions at 706 and 707.

At 708, an estimate of the external noise in the communication channel is calculated using the effective noise measured at 602, the representation of the relationship selected at 706, and the applicable values selected at 707. As described with respect to the method 600, the external noise estimate may be calculated, for example, at the receiver using the process 350 described with respect to FIG. 3. According to other examples, the external noise estimate may be calculated at the transmitter, at the controller, or at some other network device.

Although not explicitly shown in FIG. 6 or 7, the estimate of external noise calculated at 608 or 708 may be used in a determination of whether or not make a change in one or more parameters of the communication network. The network parameters may include, for example, any combination of channel power, choice of modulation format, carrier recovery parameters or other modem parameters, routing of a channel or its neighbours, and the like. According to some examples, changes may be initiated by controller device 108 transmitting signals to one or more other devices in the communication network. The change(s) in network parameters may be automatic in response to the estimate of external noise provided at 608 or 708, or may be based on actions performed by a user. For example, in response to viewing the estimate of external noise on a display screen of the controller device 108, an administrator may initiate an adjustment of one or more network parameters, for example, using a keyboard of the controller device 108.

The preceding examples have been described in the context of calculating estimates of external noise in a communication channel using measurements of effective noise on decoded symbols at a receiver, based on a stored representation of a relationship between the effective noise, the external noise, and the applicable values of one or more variable parameters. However, this general technique may be applied in other ways. For example, various control loops executing at the receiver may be sensitive to external noise or interference that is attributed to some source outside the receiver. Certain properties of these control loops could be measured and used, in conjunction with the appropriate stored relationships and applicable parameter values, to estimate this external noise or interference. In one example, the measurement could be based on an error signal in a receiver control loop, such as the variance of the error signal in a carrier recovery loop, a clock recovery loop, or a channel equalization LMS controller. In another example, the measurement could be based on an action of a receiver control loop, such as the variance of a time delay, a phase rotation, or finite impulse response tap values. In general, based on a stored representation of a relationship between external noise attributed to a communication channel, an indicator that is sensitive to the external noise, and one or more variable parameters, it may be possible to calculate an estimate of the external noise using a measurement of the indicator, together with the applicable values of the parameters.

The scope of the claims should not be limited by the details set forth in the examples, but should be given the broadest interpretation consistent with the description as a whole.

What is claimed is:

1. A system for estimating external noise in a communication channel, the system comprising:
    circuitry configured to obtain a measurement of effective noise on decoded symbols at a receiver device, the decoded symbols comprising noisy versions of symbols conveyed by a communication signal transmitted over the communication channel between a transmitter device and the receiver device;
    circuitry configured to store a representation of a relationship between the effective noise, a value characterizing external noise in the communication channel, and one or more variable parameters;
    circuitry configured to store applicable values of the one or more variable parameters, wherein each applicable value is associated with current properties of the transmitter device or current properties of the receiver device or both; and
    circuitry configured to calculate an estimate of the external noise in the communication channel using the effective noise, the applicable values of the one or more variable parameters, and the representation of the relationship.

2. The system as claimed in claim 1, wherein the one or more variable parameters comprise internal noise parameters representing respective contributions of the transmitter device and the receiver device to implementation noise in the system.

3. The system as claimed in claim 1, wherein the one or more variable parameters comprise eye closure parameters representing respective contributions of the transmitter device and the receiver device to noise enhancement at the receiver device.

4. The system as claimed in claim 1, wherein the current properties comprise any combination of
    one or more operating settings of the transmitter device,
    one or more operating settings of the receiver device,
    one or more operating conditions of the transmitter device, and
    one or more operating conditions of the receiver device.

5. The system as claimed in claim 1, wherein the current properties comprise identifiers of the transmitter device or the receiver device or both.

6. The system as claimed in claim 1, further comprising
    circuitry configured to store a plurality of possible values of each of the one or more variable parameters, the plurality of possible values being associated with a respective plurality of possible properties of the transmitter device or possible properties of the receiver device or both; and
    circuitry configured to select the applicable values from the possible values based on the current properties of the transmitter device or the current properties of the receiver device or both.

7. The system as claimed in claim 6, further comprising circuitry configured to receive at least one of the applicable values in a transmission from another device.

8. The system as claimed in claim 1, further comprising circuitry configured to store a plurality of possible representations of the relationship; and circuitry configured to select the representation from the possible representations based on the current properties of the transmitter device or the current properties of the receiver device or both.

9. The system as claimed in claim 8, further comprising circuitry configured to receive the selected representation in a transmission from another device.

10. The system as claimed in claim 1, further comprising circuitry configured to calculate a new estimate of the external noise in the communication channel in response to detecting a change in one or more of the applicable values.

11. A method for estimating external noise in a communication channel, the method comprising:
  obtaining a measurement of effective noise on decoded symbols at a receiver device, the decoded symbols comprising noisy versions of symbols conveyed by a communication signal transmitted over the communication channel between a transmitter device and the receiver device;
  storing a representation of a relationship between the effective noise, a value characterizing external noise in the communication channel, and one or more variable parameters;
  storing applicable values of the one or more variable parameters, wherein each applicable value is associated with current properties of the transmitter device or current properties of the receiver device or both; and
  calculating an estimate of the external noise in the communication channel using the effective noise, the applicable values of the one or more variable parameters, and the representation of the relationship.

12. The method as claimed in claim 11, wherein the one or more variable parameters comprise internal noise parameters representing respective contributions of the transmitter device and the receiver device to implementation noise.

13. The method as claimed in claim 11, wherein the one or more variable parameters comprise eye closure parameters representing respective contributions of the transmitter device and the receiver device to noise enhancement at the receiver device.

14. The method as claimed in claim 11, wherein the current properties comprise any combination of
  one or more operating settings of the transmitter device,
  one or more operating settings of the receiver device,
  one or more operating conditions of the transmitter device, and
  one or more operating conditions of the receiver device.

15. The method as claimed in claim 11, wherein the current properties comprise identifiers of the transmitter device or the receiver device or both.

16. The method as claimed in claim 11, further comprising
  storing a plurality of possible values of each of the one or more variable parameters, the plurality of possible values being associated with a respective plurality of possible properties of the transmitter device or possible properties of the receiver device or both; and
  selecting the applicable values from the possible values based on the current properties of the transmitter device or the current properties of the receiver device or both.

17. The method as claimed in claim 16, further comprising
  receiving at least one of the applicable values in a transmission from another device.

18. The method as claimed in claim 11, further comprising
  storing a plurality of possible representations of the relationship; and
  selecting the representation from the possible representations based on the current properties of the transmitter device or the current properties of the receiver device or both.

19. The method as claimed in claim 18, further comprising
  receiving the selected representation in a transmission from another device.

20. The method as claimed in claim 11, further comprising
  calculating a new estimate of the external noise in the communication channel in response to detecting a change in one or more of the applicable values.

* * * * *